P. WAGNER.
APPARATUS FOR MEASURING THE AXIAL THRUST ACTING UPON A SHAFT.
APPLICATION FILED SEPT. 28, 1910.
1,063,625.
Patented June 3, 1913.
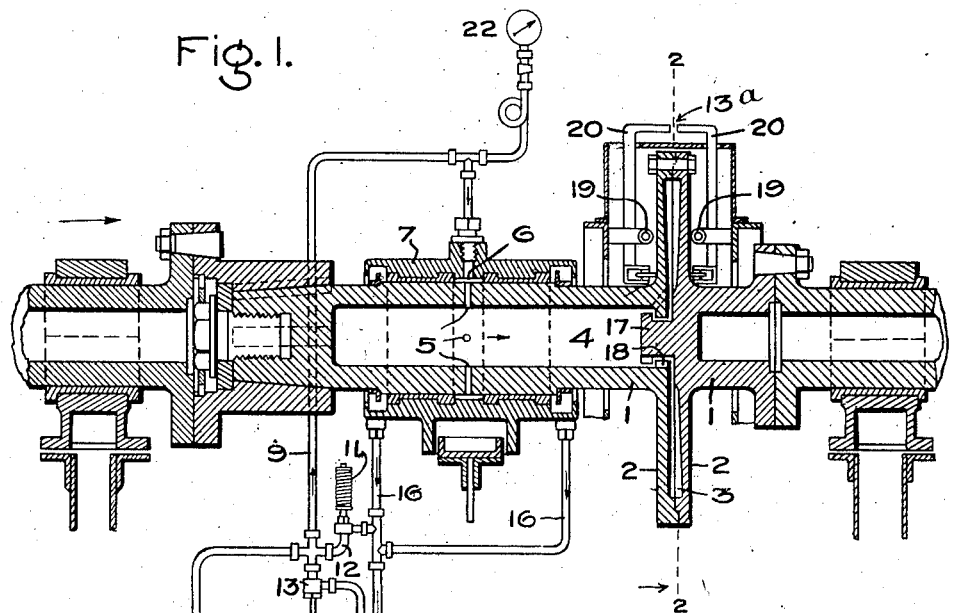
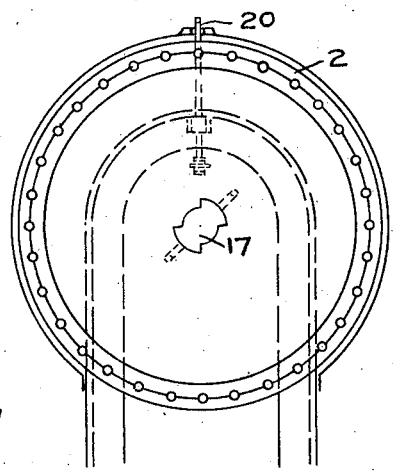
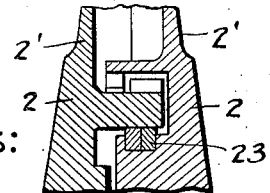
Witnesses:
Inventor,
Paul Wagner,
by Albert G. Davis
Att'y.

P. WAGNER.
APPARATUS FOR MEASURING THE AXIAL THRUST ACTING UPON A SHAFT.
APPLICATION FILED SEPT. 28, 1910.

1,063,625.

Patented June 3, 1913.

2 SHEETS—SHEET 2.

Witnesses:
Marcus L. Byng.
Earl G. Klock.

Inventor,
Paul Wagner,
by Albert G. Davis
Att'y

UNITED STATES PATENT OFFICE.

PAUL WAGNER, OF BERLIN, GERMANY, ASSIGNOR TO GENERAL ELECTRIC COMPANY, A CORPORATION OF NEW YORK.

APPARATUS FOR MEASURING THE AXIAL THRUST ACTING UPON A SHAFT.

1,063,625.  Specification of Letters Patent.  Patented June 3, 1913.

Application filed September 28, 1910. Serial No. 584,187.

*To all whom it may concern:*

Be it known that I, PAUL WAGNER, a subject of the Emperor of Germany, residing at Berlin, Germany, have invented certain new and useful Improvements in Apparatus for Measuring the Axial Thrust Acting Upon a Shaft, of which the following is a specification.

This invention relates to a device for measuring axial thrust acting upon a propeller or other shaft.

In the thrust-measuring devices heretofore employed a coupling has been inserted in the shaft which consisted of elastic plates. The extent of the mutual approximation of these elastic plates, caused by the axial thrust served as a measure of the extent of the thrust exerted. This arrangement had the disadvantage that the coupling plates were constantly weighted with the entire axial pressure so long as such pressure existed. By the present invention such constantly great strain is avoided by providing the coupling plates with stops which after a slight bending on the part of one or both plates transmit the strain of pressure or pull exerted on the one portion of the shaft directly to the other. The measurement of the thrust itself is effected (since by reason of the stops the extent of the elastic flexion cannot serve as a measure of the thrust exerted on the shaft) by determining the pressure of a fluid which is pumped in between the coupling plates until they assume again, with relation to the above-mentioned stops, their normal position which they held before a thrust was exerted. The total thrust is then received by the fluid and the pressure thereof as indicated on a gage, gives a direct measure of the extent of the thrust itself.

Figure 3:
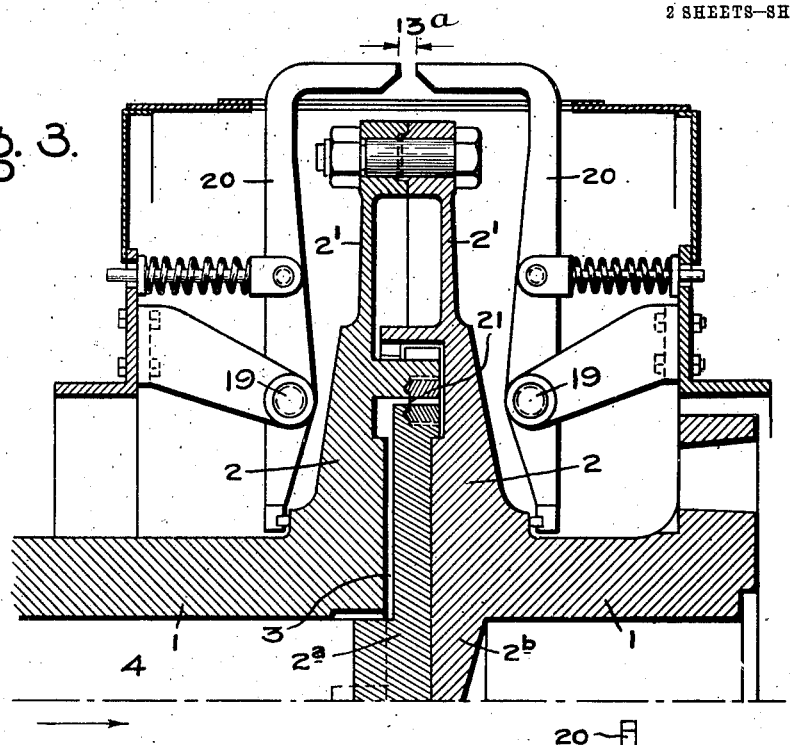
Figure 4:
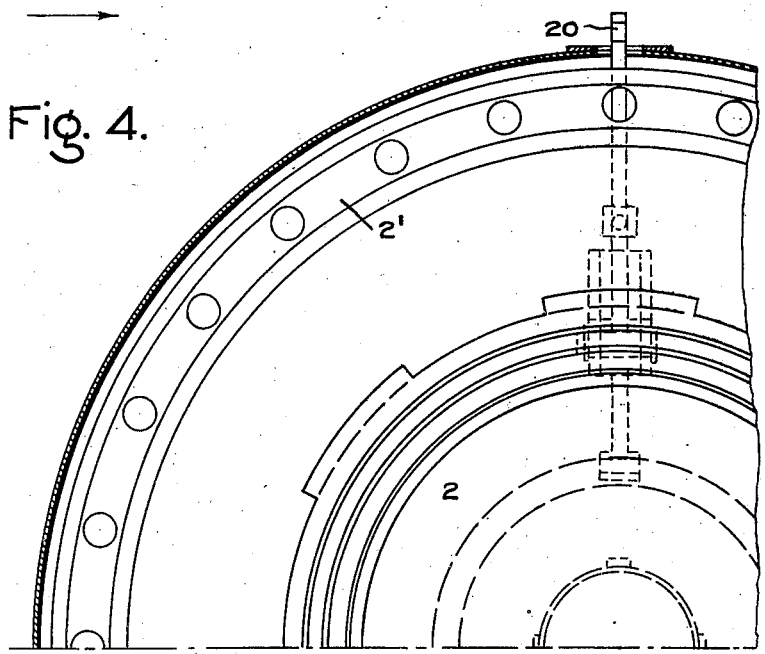

In the accompanying drawing, Figure 1 is a longitudinal section of one embodiment of my invention; Fig. 2 is a cross-section of the same on the line 2—2, Fig. 1; Figs. 3 and 4 are respectively longitudinal and cross sections of another illustrative form of construction; and Fig. 5 is a partial sectional view of a modification of the apparatus of Figs. 3 and 4.

In the shaft 1, upon which is exerted an axial thrust in the direction of the arrow, is inserted a plate-coupling 2, the somewhat elastic walls of which include between them, in the form shown in Figs. 1 and 2, a hollow space 3 which is filled with fluid under pressure by forcing the latter by the pump 8 into a bore 4 in the shaft, which bore is constantly connected with the hollow space 3; the fluid passing through openings 5 which open into the circular chamber 6 in a non-rotatable sleeve 7 surrounding the arbor or shaft. Into the pipe 9 connecting the pump 8 with the circular chamber 6 is further introduced a double exit-pipe 10 and 12, the former of which may be opened by a valve 13, while in the second is constructed a safety valve 11. These exit pipes open into a receptacle 15 from which the working fluid is again supplied to the pump 8 driven by the motor 8'. The small amount of fluid passing out between the shaft and sleeve 7 at the sides of the latter is returned likewise to the receptacle 15 through the pipes 16. The coupling of the shaft parts 1 is effected, in coöperation with the plates 2 connected closely together at the edge, by means of a bayonet joint 17, 18. The two parts of this joint are so constructed that, failing any thrust of the shaft, some clearance remains between the ends of the shaft-portions 1 in both longitudinal directions. This middle position of the coupling is indicated by the deflection 13$^a$ of two calipers 20 rotatable about the pivots 19, which calipers rest as to their lower ends during the measuring operation, upon the coupling plates near the shaft.

In the construction of Figs. 3 and 4, only the outer part 2' of the plates 2 is elastic, while the part connected to the shaft 1 is made sufficiently thick to permit the fluid pressure prevailing between the plates during a measurement to be received without bending. By confining the fluid chamber 3 to the space between these rigid plate portions, the elastic plate portions are freed from any fluid pressure. The suitable restriction of the chamber 3 is attained by means of a flexible circular membrane 21 located at a suitable height between the coupling plates. In order, however, notwithstanding the non-removable connection of the parts of the coupling by the circular membrane 21, to permit separating from each other in an emergency, the rigid portion of one coupling plate 2 is divided perpendicularly to the shaft axis in such manner that notwithstanding the firm connection of the one part representing one pressure plate 2ᵃ with the one end of the membrane, the remaining plate portion 2ᵇ may be removed at the same time with the shaft belonging thereto after loosening the peripheral screws.

The method of operation is as follows: The thrust of the propeller is, so long as no measurement is taking place, transmitted from one shaft portion 1 to the other not only in forward but also in backward revolution directly through the projections on the bayonet joint 17, 18 or through specially arranged pressure surfaces; the coupling plates 2 bending only to an unimportant degree to correspond to the small play between the parts of the bayonet joint. For the purpose of measuring the thrust in the direction of the arrow, Fig. 1, a fluid is forced by the pump 8 into the chamber 3 between the plates 2, the pressure gradually increasing, and this pumping of fluid continues until the free ends of the calipers 20 resting on the coupling plates show by their distance from each other to the extent of 13ᵃ, that the ends of the shaft have the same distance from each other as before the occurrence of the thrust to be measured, that is, that the total thrust is taken up by the fluid pressure.

In the construction of Figs. 3 and 4, the elastic parts of the coupling plates are in the position shown free from bending strains. The gradual increase in pressure of the fluid forced by the pump is attained by suitable closure of the valve 13, whereby the over-flow to the receptacle 15 is more and more throttled. By suitable adjustment of the gage 22 it is possible to read directly thereon the thrust exerted. By the method given, any desired thrust occurring in other ways, exerted in one direction upon an arbor or shaft, may be determined.

The invention contemplates the use not only of the fluid, but also of a gaseous pressure medium, for example compressed air, the apparatus being suitably constructed therefor. Likewise it is not necessary that the entire axial thrust be taken by the pressure medium, but within the limits established by the stops on the coupling, a portion of the thrust may be determined in the former manner by the mutual approximation of the plates, so that the only remaining axial thrust is taken up by the pressure of the medium introduced into the coupling. Instead of the membrane, Fig. 3, employed for dividing the hollow chamber between the coupling plates, any other axially adjustable packing may be employed, such for example as the packing 23, Fig. 5, whereby, with suitable construction, the division of the one coupling plate for the purpose of the ready release of the coupling parts from each other may be discontinued as unnecessary.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a shaft made in sections, of a coupling for said sections comprising members fixedly attached to the adjacent ends of the sections and forming a chamber between them that is closed at its periphery, one member and section being movable relatively to the other so as to vary the size of the chamber, means supplying fluid under pressure to the inner portion of the chamber, a pressure indicating device and devices for transmitting rotary motion from one member to the other.

2. The combination with a shaft made in two sections, of an elastic coupling therefor capable of longitudinal movement, and stops to limit such movement and enable the thrust to be directly transmitted when it exceeds a predetermined amount.

3. The combination with a shaft made in two sections, of an elastic coupling therefor capable of longitudinal movement, and a bayonet joint connecting together the coupling parts attached to the two sections of the shaft, said joint permitting axial play.

4. The combination with a shaft made in two sections, of a hollow elastic coupling therefor, a bayonet joint for connecting said sections and limiting the axial play thereof, and stationary levers bearing respectively against the parts of said coupling and having their free ends in proximity.

5. The combination with a hollow shaft made in two sections, of a hollow elastic coupling therefor, a stationary sleeve surrounding the shaft and having a circumferential groove communicating with the interior of said shaft, a fluid pump connected with said groove, a controllable by-pass for the pump, and means for determining the pressure of the fluid supplied to the interior of the shaft.

6. The combination with a shaft made in two sections, of an elastic coupling therefor, consisting of plates having only their outer portions elastic, means for forcing fluid under pressure into the space between the plates, a packing confining the fluid to the space between the rigid portions of said plates, and a device for indicating the pressure of the fluid supplied to the space between the plates.

7. The combination with a shaft made in two sections, of an elastic coupling therefor, consisting of plates having only their outer portions elastic, means for forcing fluid under pressure into the space between the plates, means for measuring the fluid pressure and a packing confining the fluid to the space between the rigid portions of the plates, said packing consisting of a membrane attached to one of said plates.

8. The combination with a shaft made in two sections, of an elastic coupling therefor composed of plates having only their outer portions elastic, means for forcing fluid under pressure into the space between the plates, means for measuring the fluid pressure, and a packing consisting of a membrane for confining the fluid to the space between the rigid portions of the plates, one of the plates being composed of two parts, only one of which is attached to the membrane, while the other part is removable with the shaft section without disturbing said first mentioned part.

9. The combination with a shaft made in sections, of a coupling therefor comprising elastic plates carried by the adjacent ends of the sections and inclosing a chamber between them, which plates permit one section to move relatively to the other as the thrust on the shaft varies, means supplying fluid under pressure to the chamber, a pressure indicating device and means securing the rims of the plates to each other to transmit motion from one section to the other.

10. The combination with a shaft made in sections that are movable relatively to each other, of elastic members on the adjacent ends of the sections that inclose a chamber between them, devices for supplying fluid under pressure to the chamber, a pressure indicating device and means for transmitting motion from one member to the other.

In witness whereof, I have hereunto set my hand this 13th day of September, 1910.

PAUL WAGNER.

Witnesses:
ERICK UBERLÉE,
GUSTAV HULBROCK.

Copies of this patent may be obtained for five cents each, by addressing the "Commissioner of Patents, Washington, D. C."